United States Patent [19]

Hackleman et al.

[11] Patent Number: 4,694,302

[45] Date of Patent: Sep. 15, 1987

[54] REACTIVE INK-JET PRINTING

[75] Inventors: David E. Hackleman, Monmouth; Norman E. Pawlowski, Corvallis, both of Oreg.

[73] Assignee: Hewlett-Packard Company, Palo Alto, Calif.

[21] Appl. No.: 871,346

[22] Filed: Jun. 6, 1986

[51] Int. Cl.$^4$ ............................................. G01D 15/16
[52] U.S. Cl. ....................................... 346/1.1; 106/20; 346/75; 346/135.1; 346/140 R; 427/150
[58] Field of Search ............... 346/1.1, 140, 75, 135.1; 427/150, 151; 106/20, 22, 23

[56] References Cited

U.S. PATENT DOCUMENTS

| | | | |
|---|---|---|---|
| 4,196,437 | 4/1980 | Hertz | 346/1.1 |
| 4,382,262 | 5/1983 | Savit | 346/1.1 |
| 4,538,160 | 8/1985 | Uchiyama | 346/140 |
| 4,554,555 | 11/1985 | Aruga | 346/1.1 |
| 4,599,627 | 7/1986 | Vollert | 346/140 |

OTHER PUBLICATIONS

Bailey et al.; Silonate Monomer for Inks, IBM TDB, vol. 23, No. 11, Apr. 1981, pp. 5002–5003.

*Primary Examiner*—Joseph W. Hartary
*Attorney, Agent, or Firm*—William J. Bethurum

[57] ABSTRACT

A method of increasing the water fastness and print quality of an ink employed in ink-jet printers is provided. The method involves providing a reactive species that reacts with a component in the substrate (i.e., paper) to form a polymer that binds the dye in the ink to the polymeric lattice. Alternatively, a separate reactive component may be deposited on the substrate on the same location as the reactive species which causes a polymeric reaction to occur. In this case, the ink may be in one or the other or both reactive components. An ink-jet printer having indexed orifices permits registration of deposited droplets of ink and reactive species to form the desired product.

30 Claims, No Drawings

REACTIVE INK-JET PRINTING

TECHNICAL FIELD

This invention relates to ink compositions employed in ink-jet printing, and, more particularly, to a method of improving the water fastness of the ink by means of a chemical reaction to form a polymeric lattice for binding the dye of the ink thereto.

BACKGROUND ART

Safe inks employed in ink-jet printers generally contain water soluble dyes which are not very smear resistant after drying on paper.

Printing of colored ink on paper using ink-jet printing is known. See, for example, Savit, U.S. Pat. No. 4,382,262. In that patent, drops of clear material are fired onto a specially treated paper, which combines with material in the paper to form colored dots. Several jets are employed; each jet is connected to a reservoir containing a different colorless material, which upon contact with the specially treated substrate chemically reacts to provide a different color.

U.S. Pat. No. 4,360,548 provides a hidden image, made detectable by rubbing, by applying to a substrate a first ink-like material in image configuration, followed by a second ink-like material to cover the image and the area surrounding the image. Each of the two materials contain one of a color-forming pair of reactants which are substantially colorless, but which together react to form a colored product.

Neither of these references discloses nor suggests forming smear-resistant inks on a substrate. Thus, a need remains for a simple method for improving the water fastness of the ink on a substrate.

SUMMARY OF THE INVENTION

In accordance with the invention, a method of improving the water fastness of an ink on a substrate using an ink-jet printer is provided. The method comprises (a) providing an ink-jet print head having at least one orifice connected to a reservoir and adapted to deposit ink on a substrate, (b) providing in a reservoir an ink composition comprising a dye and a vehicle and (c) providing in a reservoir at least one reactive species capable of reacting with a species to form a polymer on the substrate, the polymer binding the dye thereto.

The reactive species may be present in the ink itself (one component system) or in a separate reservoir (two component system). In the latter case, the print head may comprise a plurality of pairs of orifices, or two separate print heads may be employed. In either print head configuration, the orifices are indexed so that the ink and the reactive species will both be deposited on the same location of the substrate.

The reaction reaction of the reactive species with the substrate (one component system) or with the ink (two component system) forms a polymer which binds the dye and thus improves water fastness of the ink.

DETAILED DESCRIPTION OF THE INVENTION

The discussion which follows is presented in terms of an ink having as the vehicle a glycol-water or alcohol-water base. However, it will be appreciated that the teachings of the invention may be applied to other vehicles in inks employed in ink-jet printing.

In the use of the method, an ink-jet print head is provided, with at least one orifice provided with the head and a liquid reservoir connected with the orifice. As used herein, the print head may have associated therewith the two orifices and corresponding liquid orifices or nozzles. Alternatively, the print head may comprise two separate head systems, each with its own orifice and reservoir, but indexed so as to fire a drop of liquid in such a fashion as to achieve substantial overlay of one drop from one orifice by one drop from the other orifice.

It will be appreciated that in the typical ink-jet apparatus, a print head comprises a plurality of nozzles, each fed by a common reservoir. The ink is deposited on the substrate either by a piezoelectric element or, in the case of thermal ink-jet printing, by a resistor associated with a nozzle which is activated at the appropriate time for depositing the ink. In the thermal ink-jet printer, a drop of ink from the reservoir is heated by the resistor to form a bubble and propelled or "fired" toward the substrate. In any event, firing of a series of bubbles of ink in a particular desired pattern results in formation of a desired character on the substrate.

The substrate employed in the practice of the invention commonly comprises ordinary cellulosic paper. However, other substrates may also be employed, such as fibrous and resinous sheet or film material and nonporous transparent polyester films and similar materials which are difficult to mark. Suitable examples also include cellulose acetate and mylar.

The ink compositions employed in the practice of the invention commonly comprise a vehicle consisting essentially of a glycol (glycol ether or polyhydric alcohol and monomethyl derivatives thereof) or low molecular weight alcohol (one to five carbon atoms) and, optionally, water plus a dye. Unless otherwise indicated, compositions given are in terms of weight percent (wt. %).

A surfactant, typically about 0.01%, may be added to improve wettability of the ink on paper. Examples include Atlas G-263, available from Atlas Refinery, Inc. (Newark, NJ) and Fluororad, available from 3M Company (St. Paul, MN).

A polymer may also be added to help control bubble formation. The polymer, typically present in an amount ranging from about 0.001 to 1%, may comprise polyvinyl pyrrolidone, GAFquat 734, available from the GAF Corporation, Chemical Products (New York, NY) and a mixture of polyvinyl pyrrolidone and polyvinyl alcohol.

The vehicle of the ink typically comprises at least one glycol. Glycols suitably employed in the practice of the invention include ethylene glycol, diethylene glycol, propylene glycol and polyethylene glycol. Additional examples of glycols include the glycol ethers of ethylene glycol dimethyl ether (glyme) and diethylene glycol dimethyl ether (diglyme).

The glycols may be used alone or in aqueous solution. In aqueous solutions, the glycol (or glycol mixture) is usually present in an amount ranging from about 10 to 60%, the balance being water.

Alternately, the vehicle may comprise at least one low molecular weight alcohol, such as an alcohol having from one to five carbon atoms. Examples include methanol, ethanol, iso-propanol and tert-butanol. The alcohol is usually present in an amount ranging from about 0 to 50%, the balance being at least one of water and one or more glycols.

The dye is present in tinctural strength, namely, about 1 to 10% of the ink composition. The dye may be an anionic or a cationic dye, black or colored. Examples of anionic dyes include sulfonic acid dyes and acid forms of azo dyes, such as Food Black 2. Examples of cationic dyes include triaryl methanes, such as Acid Blue 9, and salts of amino groups on dyes, such as Direct Black 17 and copper phthalocyanine.

In accordance with the invention, the water fastness of the ink is improved by including a reactive species that is reactive either with a component of the ink or with the substrate to form a polymer which binds the dye thereto. The reactive species is included with the ink if the reaction is with the substrate (one component system) or is maintained in a separate reservoir and fired through a separate orifice if the reaction is with a component of the ink (two component system). In the latter case, the orifices are indexed so that both the ink and reactive species are deposited on the same location on the substrate.

As an example of a one component system, an ink comprises a colloidal suspension of carbon black in diglyme solvent. The carbon black is present in an amount of 6% by weight. The reactive species is an aliphatic diacid dihalide, such as sebacyl chloride, present in a concentration of about 7%.

Upon deposition on a cellulose-containing substrate, such as paper, the sebacyl chloride reacts with the cellulose to form a cellulosic polymer, which in one form is commonly known as rayon. The carbon particles are held in the polymer lattice. As a consequence, the ink is very waterfast.

An example of a two component system comprises an ink in which the vehicle comprises 15% diethylene glycol and the balance water and the dye is Food Black 2. The reactive species comprise carboxymethyl cellulose (CMC), present in essentially the same vehicle as the ink, the concentration ranging from about 0.1 to 1%, and an aluminum salt. The reaction yields an insoluble salt of the CMC polymer. The aluminum salt is conveniently present as a 2% solution in water. Various salts of aluminum or other cations are used to adjust the pH and precipitation rate of the polymer. Examples of suitable aluminum salts include aluminum chloride, $AlCl_3$, and aluminum hydroxy acetates, $Al(C_2H_3O_2)_{x-}(OH)_{3-x}$, where x is an integer from 1 to 3.

The carboxymethyl cellulose is maintained in one reservoir, the aluminum salt in another. The dye may be in either reservoir.

Again, the result is a chemical reaction which forms a polymer and binds the dye of the ink in the polymer lattice, thereby forming a water-fast ink.

Analogous to the reaction of a carboxy-cellulose and aluminum salt is the reaction of an amino-cellulose and a carbonate salt. For example, chitosan, which is a cellulose polymer containing amino groups, reacts with an alkalai or alkaline metal carbonate ($Na_2CO_3$, $K_2CO_3$) to form an insoluble product. As above, the amino-cellulose may be contained in one reservoir and the carbonate in another.

An example of another two component system comprises hexamethylenediamine in one reservoir and and an aliphatic diacid, such as adipic acid (or adipic anhydride), or the dihalide form thereof in a second reservoir. The dye may be in either or both reservoirs. However, the best dot regularity in placement on the substrate is generally obtained with the ink nozzle connected to the reservoir containing the dye fired second.

The foregoing reaction results in the formation of nylon 66. While the foregoing reaction requires a temperature of about 280° C., other nylon-forming reactions are exothermic and occur at room temperature.

EXAMPLES

Example 1

In a one-pen configuration, the ink comprised a colloidal suspension of 5% carbon black in diglyme. The reactive species was sebacyl chloride, present in a concentration of 7%. The ink was deposited onto a cellulose-containing substrate to form a cellulosic polymer. Qualitatively, the print quality was good compared to existing thermal ink-jet printing and the water fastness was far superior to any ink observed to date in ink-jet printing. The paper dissolved before the ink did.

Example 2

In a two-pen configuration, one reservoir contained a 2% aqueous solution of $AlCl_3$. The second reservoir contained a 5% dye (Food Black 2), 0.1 to 1% carboxymethyl cellulose, 15% diethylene glycol and the balance water. The reaction of the two components on a paper substrate produced an insoluble salt of the carboxymethyl cellulose polymer. This polymer encapsulated the dye and gave a protective coating to the paper. The result was a very water-fast print with excellent quality. Very quick fixing to the paper was observed.

Thus, there has been disclosed a method of improving the water fastness of an ink on a substrate employing inkjet printing. Various changes and modifications will make themselves available to those of ordinary skill in the art, and all such changes and modifications are intended to fall within the scope of the invention as defined by the appended claims.

What is claimed is:

1. A method of improving the water fastness of an ink on a substrate employing ink-jet printing comprising:
   (a) providing said substrate;
   (b) providing an ink-jet print head having at least a first set of nozzles connected to a first reservoir;
   (c) providing an ink composition comprising a coloring agent and a vehicle and at least one reactive species capable of reacting with a second species to form a polymer on said substrate, said polymer binding said coloring thereto, said second species comprising either a component in said substrate or a component maintained in a second reservoir, separate from said first reservoir and associated with a second set of nozzles indexed with said first set of nozzles; and
   (d) applying either said ink or said ink and said second component separately to said substrate to form said polymer thereon.

2. The method of claim 1 wherein said vehicle includes at least one member selected from the group consisting of glycols and alcohols.

3. The method of claim 2 wherein said glycol consists essentially of at least one member selected from the group consisting of ethylene glycol, diethylene glycol, propylene glycol, polyethylene glycol ethylene glycol dimethyl ether and diethylene glycol dimethyl ether.

4. The method of claim 3 wherein said vehicle consists essentially of diethylene glycol and water, said glycol present in an amount ranging from about 10 to 60% by weight, the balance water.

5. The method of claim 2 wherein said alcohol consists essentially of a low molecular weight alcohol comprising from one to five carbon atoms, present in an amount up to about 50% by weight, the balance water.

6. The method of claim 5 wherein said alcohol consists essentially of at least one member selected from the group consisting of methanol, ethanol, iso-propanol and tert-butanol.

7. The method of claim 1 wherein said reactive species reacts with a component in said substrate to form said polymer.

8. The method of claim 7 wherein said ink comprises a colloidal suspension of carbon black in diglyme solvent, the concentration of said carbon black being about 6%, said reactive species comprises an aliphatic diacid dihalide and said component comprises cellulose, thereby forming a cellulosic polymer.

9. The method of claim 8 wherein said aliphatic diacid dihalide consists essentially of sebacyl chloride, present in an amount of about 7%.

10. The method of claim 1 wherein said reactive species reacts with a component, maintained in a separate reservoir, on said substrate to form said polymer.

11. The method of claim 10 wherein said ink comprises a vehicle comprising about 15% diethylene glycol and the balance water and a dye consisting essentially of Food Black 2, said reactive species comprises a solution of carboxymethyl cellulose in substantially the same vehicle in a concentration ranging from about 0.1 to 1%, maintained in a first reservoir, and said component consists essentially of a soluble aluminum salt in water in a concentration of about 2%, maintained in a second reservoir, said polymer formed on said substrate comprising a carboxymethyl cellulose insoluble salt.

12. The method of claim 10 wherein said reactive species comprises hexamethylenediamine and said component comprises a member selected from the group consisting of aliphatic diacids, the anhydride form thereof and the dihalide form thereof, said polymer formed on said substrate comprising a nylon.

13. The method of claim 12 wherein said aliphatic diacid consists essentially of adipic acid.

14. A method of improving the water fastness of an ink on a substrate employing ink-jet printing comprising:
(a) providing said substrate;
(b) providing an ink-jet print head having a plurality of nozzles connected to a reservoir;
(c) providing an ink composition comprising a coloring agent and a vehicle and at least one reactive species capable of reacting with a second species to form a polymer on said substrate, said polymer binding said coloring agent thereto, said second species comprising a component in said substrate; and
(d) applying said ink to said substrate to form said polymer thereon.

15. The method of claim 14 wherein said vehicle includes at least one member selected from the group consisting of glycols and alcohols.

16. The method of claim 15 wherein said glycol consists essentially of at least one member selected from the group consisting of ethylene glycol, diethylene glycol, propylene glycol, polyethylene glycol, ethylene glycol dimethyl ether and diethylene glycol dimethyl ether.

17. The method of claim 16 wherein said vehicle consists essentially of diethylene glycol and water, said glycol present in an amount ranging from about 10 to 60% by weight, the balance water.

18. The method of claim 15 wherein said alcohol consists essentially of a low molecular weight alcohol comprising from one to five carbon atoms, present in an amount up to about 50% by weight, the balance water.

19. The method of claim 18 wherein said alcohol consists essentially of at least one member selected from the group consisting of methanol, ethanol, iso-propanol and tert-butanol.

20. The method of claim 15 wherein said ink comprises a colloidal suspension of carbon black in diglyme solvent, the concentration of said carbon black being about 6%, said reactive species comprises an aliphatic diacid dihalide and said component comprises cellulose, thereby forming a cellulosic polymer.

21. The method of claim 20 wherein said aliphatic diacid dihalide consists essentially of sebacyl chloride, present in an amount of about 7%.

22. A method of improving the water fastness of an ink on a substrate employing ink-jet printing comprising:
(a) providing said substrate;
(b) providing an ink-jet print head having at least two separate sets of nozzles, each set connected to a separate reservoir;
(c) providing an ink composition comprising a coloring agent and a vehicle and at least one reactive species capable of reacting with a second species to form a polymer on said substrate, said polymer binding said coloring agent thereto, said ink composition maintained in a first reservoir associated with a first set of nozzles and said second species comprising a component maintained in a second reservoir associated with a second set of nozzles indexed with said first set of nozzles; and
(d) applying said ink and said second component separately to said substrate to form said polymer thereon.

23. The method of claim 22 wherein said vehicle includes at least one member selected from the group consisting of glycols and alcohols.

24. The method of claim 23 wherein said glycol consists essentially of at least one member selected from the group consisting of ethylene glycol, diethylene glycol, propylene glycol, polyethylene glycol, ethylene glycol dimethyl ether and diethylene glycol dimethyl ether.

25. The method of claim 24 wherein said vehicle consists essentially of diethylene glycol and water, said glycol present in an amount ranging from about 10 to 60% by weight, the balance water.

26. The method of claim 23 wherein said alcohol consists essentially of a low molecular weight alcohol comprising from one to five carbon atoms, present in an amount up to about 50% by weight, the balance water.

27. The method of claim 26 wherein said alcohol consists essentially of at least one member selected from the group consisting of methanol, ethanol, iso-propanol and tert-butanol.

28. The method of claim 22 wherein said ink comprises a vehicle comprising about 15% diethylene glycol and the balance water and a dye consisting essentially of Food Black 2, said reactive species comprises a solution of carboxymethyl cellulose in substantially the same vehicle in a concentration ranging from about 0.1 to 1%, maintained in a first reservoir, and said component consists essentially of aluminum chloride in water in a concentration of about 2%, maintained in a second reservoir, said polymer formed on said substrate comprising a carboxymethyl cellulose insoluble salt.

29. The method of claim 22 wherein said reactive species comprises hexamethylenediamine and said component comprises a member selected from the group consisting of aliphatic diacids, the anhydride form thereof and the dihalide form thereof, said polymer formed on said substrate comprising a nylon.

30. The method of claim 29 wherein said aliphatic diacid consists essentially of adipic acid.

* * * * *